(12) United States Patent
Ma et al.

(10) Patent No.: US 8,248,774 B2
(45) Date of Patent: Aug. 21, 2012

(54) FOLDABLE COMPUTING DEVICE

(75) Inventors: Xian-Wei Ma, Shenzhen (CN); Ting Luo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 240 days.

(21) Appl. No.: 12/796,649

(22) Filed: Jun. 8, 2010

(65) Prior Publication Data

US 2011/0149497 A1    Jun. 23, 2011

(51) Int. Cl.
*H05K 5/00* (2006.01)
*H05K 7/00* (2006.01)

(52) U.S. Cl. ......... 361/679.28; 361/679.26; 361/679.27; 361/679.55

(58) Field of Classification Search ............. 361/679.26, 361/679.27, 679.28, 679.55
See application file for complete search history.

(56) References Cited

U.S. PATENT DOCUMENTS

| | | | | |
|---|---|---|---|---|
| 6,091,601 A * | 7/2000 | Schlesener et al. | ...... | 361/679.28 |
| 6,170,120 B1 * | 1/2001 | Lu | ................... | 16/342 |
| 6,642,462 B2 * | 11/2003 | Ninomiya et al. | .......... | 200/61.7 |
| 7,733,638 B2 * | 6/2010 | Tanaka et al. | ............. | 361/679.28 |
| 7,855,879 B2 * | 12/2010 | Kim | .......................... | 361/679.28 |
| 7,974,085 B2 * | 7/2011 | Ouyang | ................... | 361/679.27 |
| 2001/0009499 A1 * | 7/2001 | Carlson | ......................... | 361/683 |
| 2004/0246667 A1 * | 12/2004 | Maskatia et al. | .............. | 361/683 |

FOREIGN PATENT DOCUMENTS

CN    2462442    11/2001

* cited by examiner

*Primary Examiner* — Anthony Haughton
(74) *Attorney, Agent, or Firm* — Altis Law Group, Inc.

(57) ABSTRACT

A notebook computer includes a display, a base, a first connector and a second connector. The display includes a cover. The cover includes a first arc-shaped end. The first arc-shaped end includes an inner surface. The inner surface includes a first conductive member. The base includes a base plate. The base plate includes a second arc-shaped end. The second arc-shaped end includes an outside surface. The outside surface includes a second conductive member. The first connector is electrically connected to the display and the first conductive member, and the second connector is electrically connected to the base and the second conductive member. When the first conductive member contacts the second conductive member, the first connector is electrically connected to the second connector.

9 Claims, 10 Drawing Sheets

FOLDABLE COMPUTING DEVICE

BACKGROUND

1. Technical Field

The present disclosure relates to foldable computing devices and, particularly, to a foldable computing device having connectors connected through the mating of a display housing and a base housing.

2. Description of Related Art

Generally, a display of a notebook computer is connected to a host via a coaxial cable. After repeated closing and opening of the display, the coaxial cable may be damaged.

BRIEF DESCRIPTION OF THE DRAWINGS

The components in the drawings are not necessarily drawn to scale, the emphasis instead being placed upon clearly illustrating the principles of a foldable computing device. Moreover, in the drawings, like reference numerals designate corresponding parts throughout the several views.

DETAILED DESCRIPTION

Figure 1:
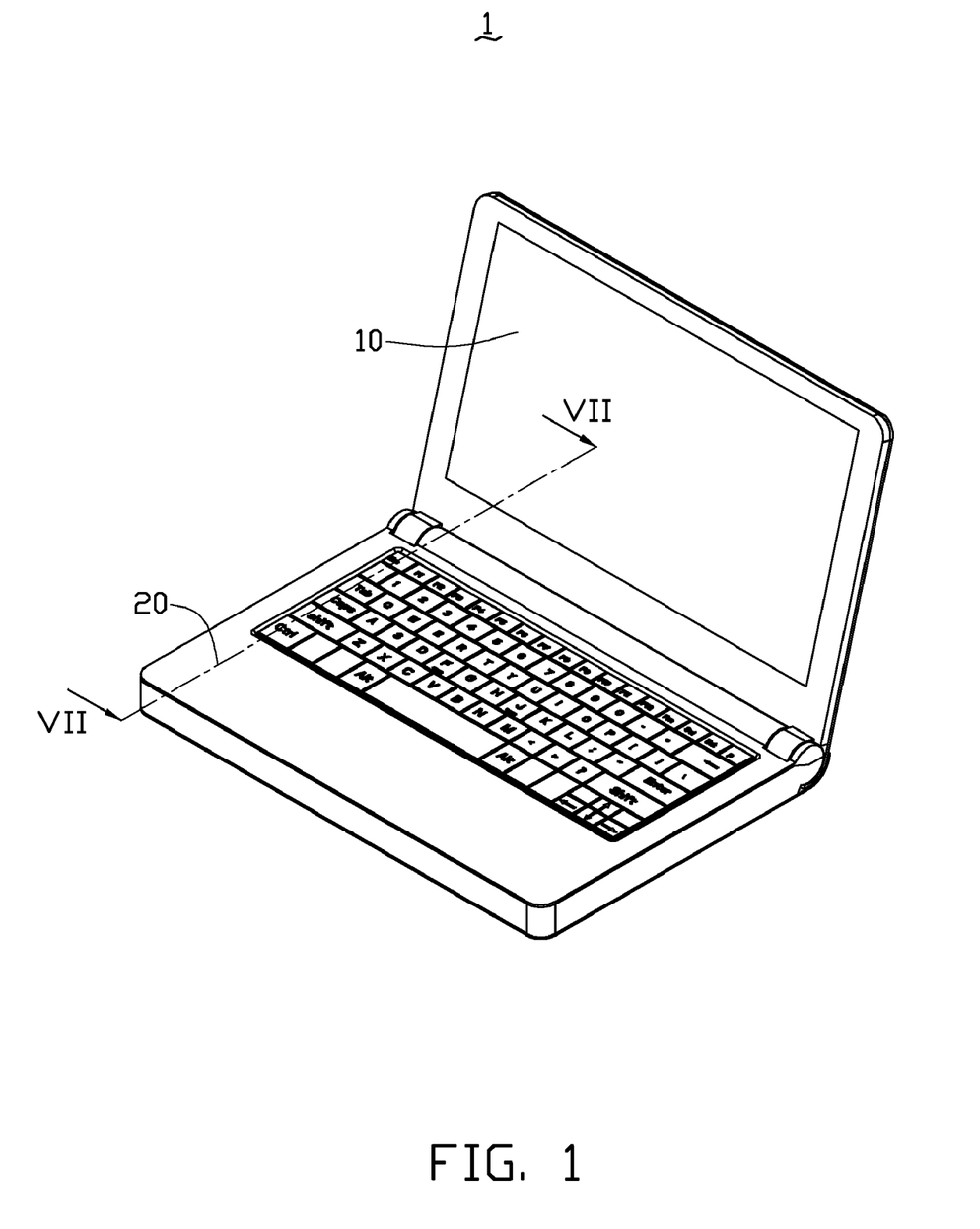
FIG. 1 is a schematic view of a foldable computing device in accordance with an exemplary embodiment.
Figure 2:
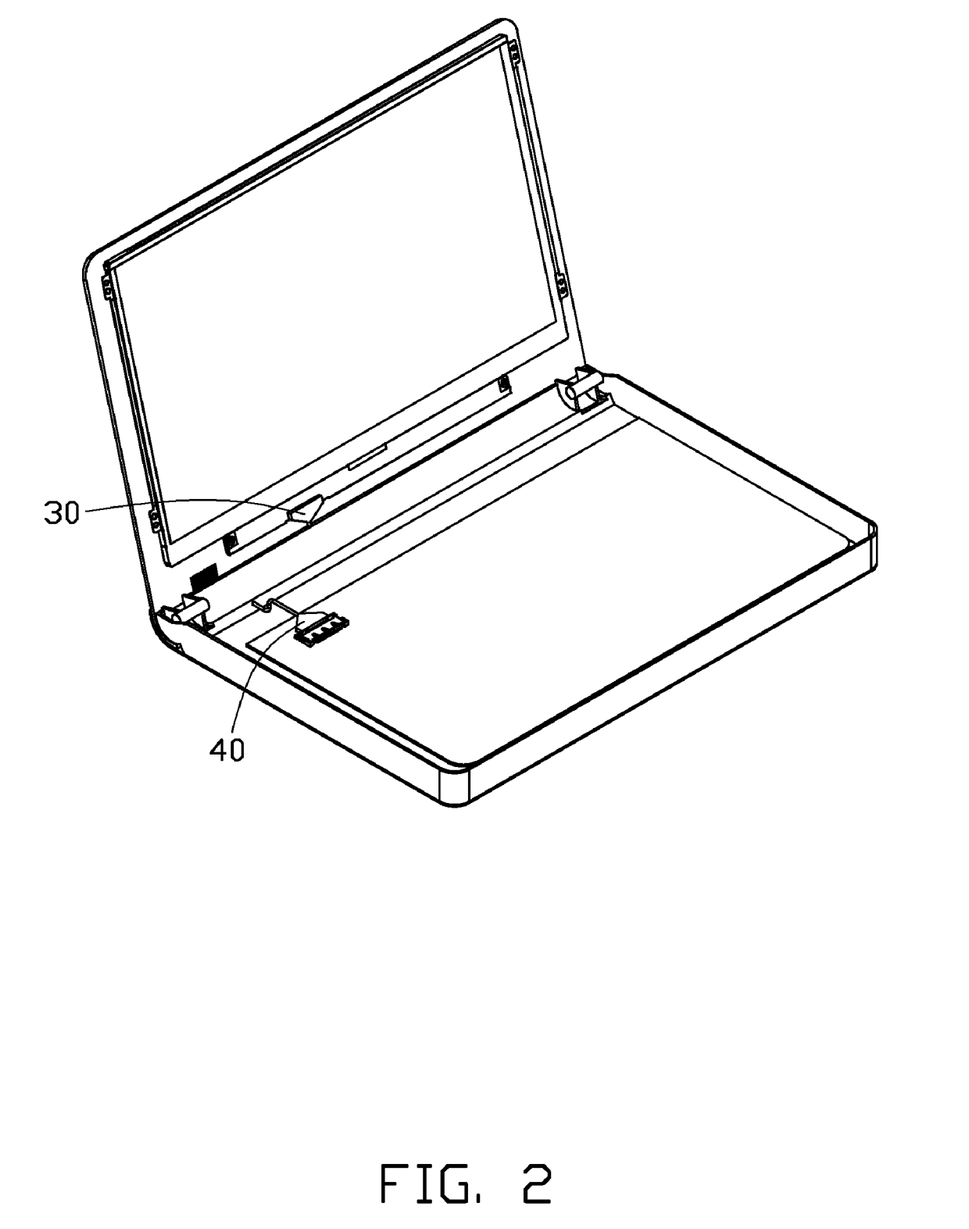
FIG. 2 is another schematic view of the foldable computing device of FIG. 1 viewed from another perspective, with certain components omitted for showing the inside.

Referring to FIGS. 1-2, a foldable computing device 1 is illustrated. In the embodiment, the foldable computing device is a notebook computer. The notebook computer 1 includes a display 10, a base 20, a first connector 30 and a second connector 40. The display 10 is rotatably connected to the base 20. The first connector 30 is electrically connected to the display 10, and the second connector 40 is electrically connected to a circuit board (not shown) of the base 20. The first connector 30 and the second connector 40 are connected together to electrically connect the display 10 to the circuit board of the base 20, such that signals can be transmitted between the display 10 and the base 20.

Figure 3:
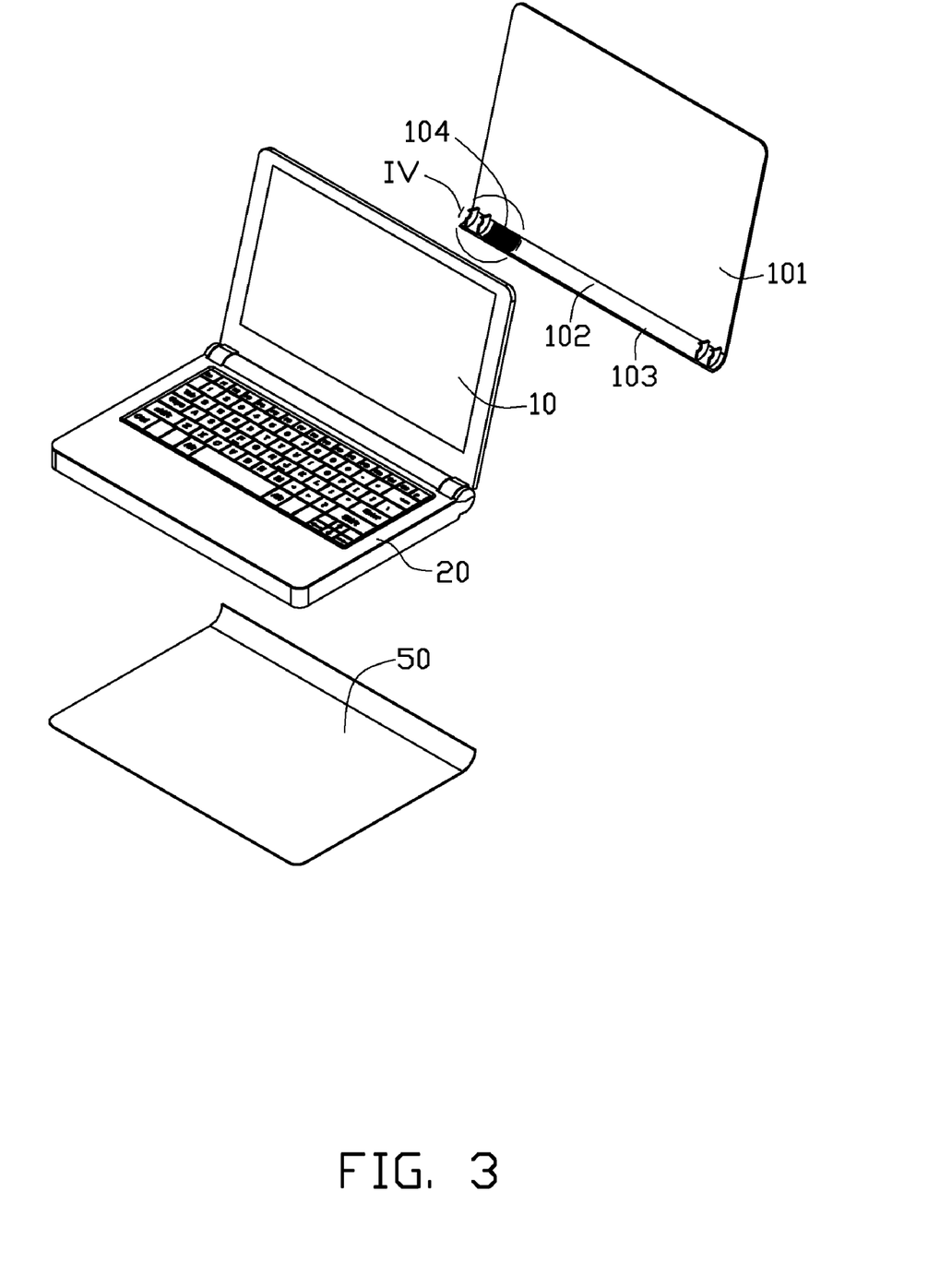
FIG. 3 is a schematic exploded view of the foldable computing device of FIG. 1.
Figure 4:
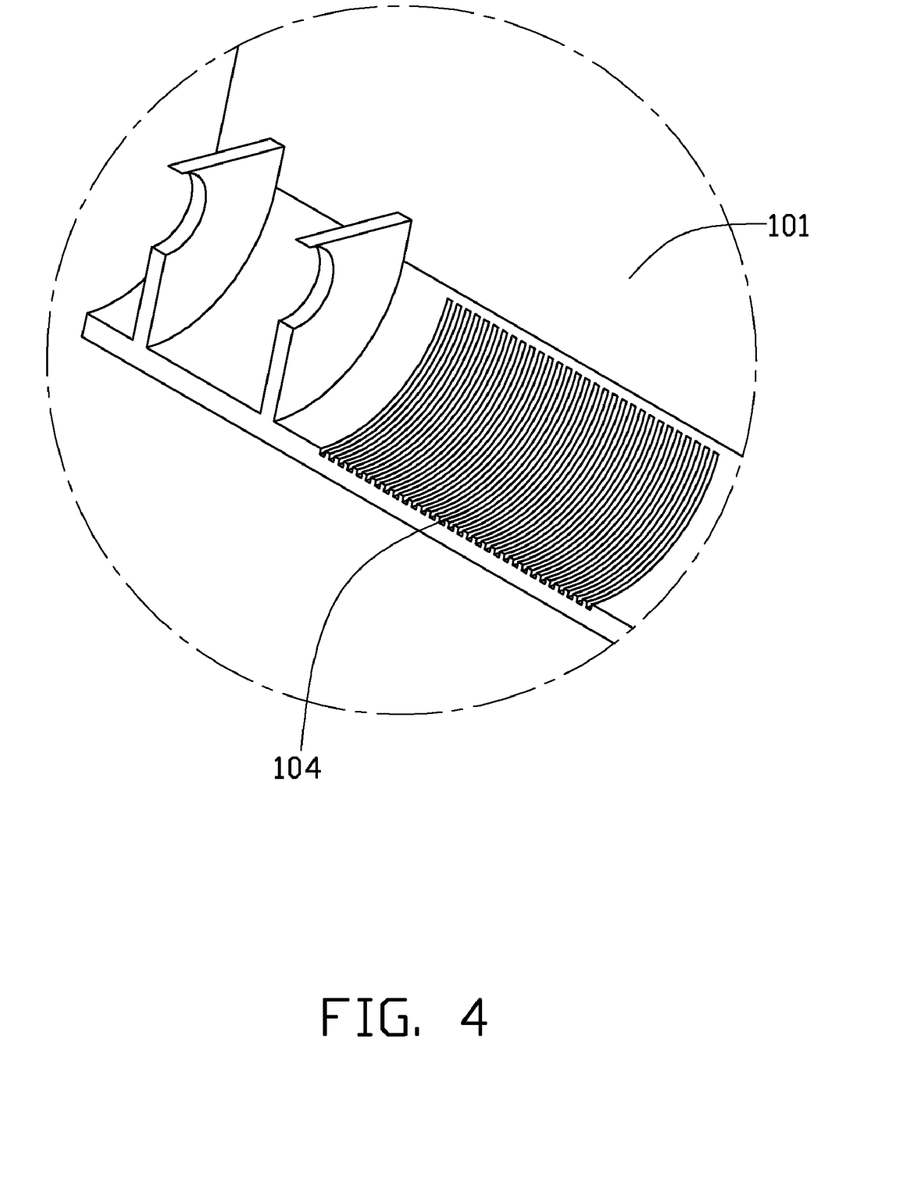
FIG. 4 is an enlarged view of the circled portion IV of FIG. 3 showing a detailed view of a first arc-shaped end.

Referring also to FIGS. 3-4, the display 10 includes an insulating cover 101 having a first arc-shaped end 102. The first arc-shaped end 102 includes an arc-shaped inner surface 103. The inner surface 103 defines a plurality of slots 104 that extend in a circumferential direction and are substantially parallel to each other. Each slot 104 includes a first conductive member 105 (see FIG. 7). In the embodiment, the first conductive member 105 is a metal layer coated on the bottom of each slot 104. Each conductive member 105 is connected to one contact (not shown) of the first connector 30.

Figure 5:
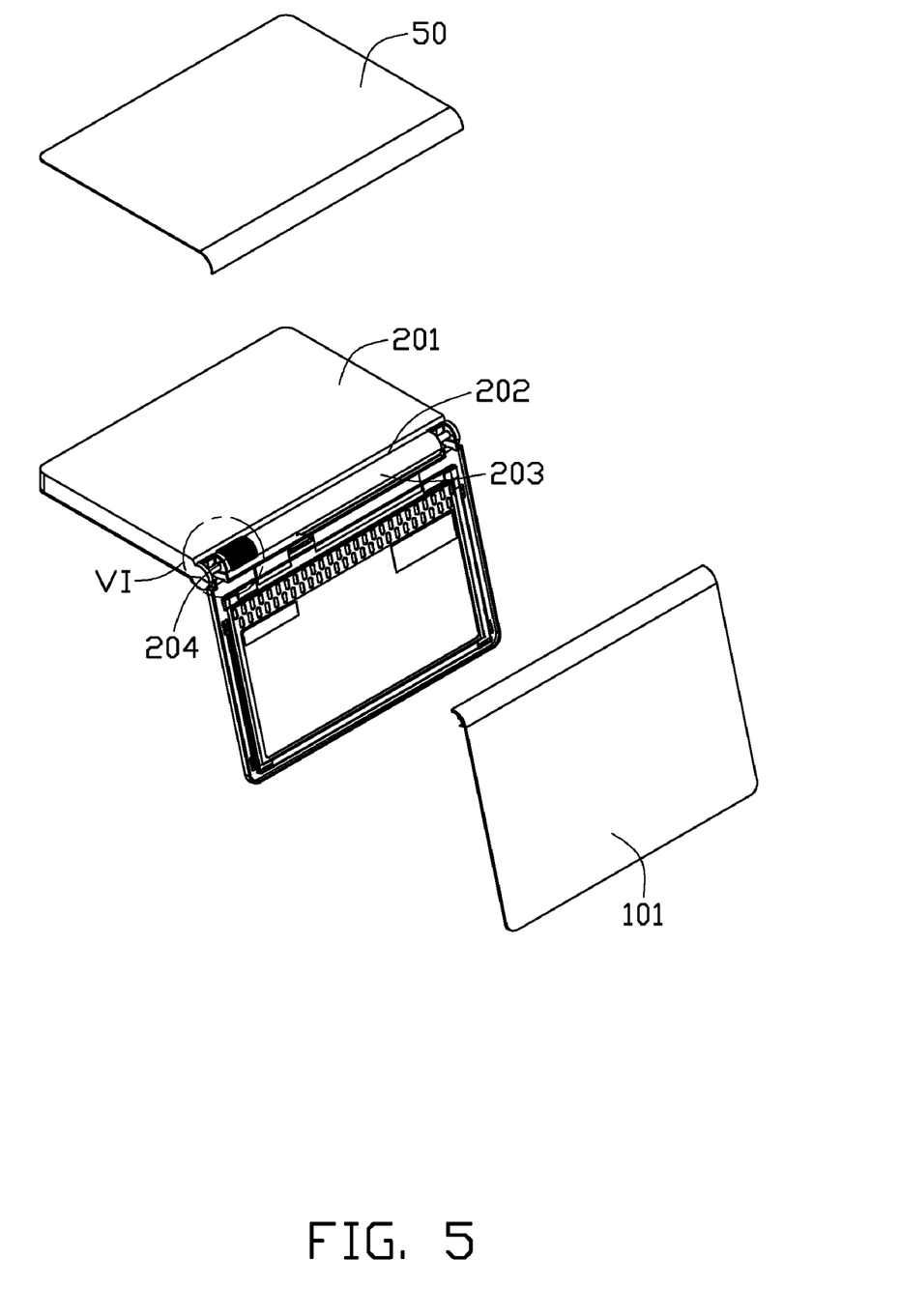
FIG. 5 is similar to FIG. 3 but viewed from another perspective.
Figure 6:
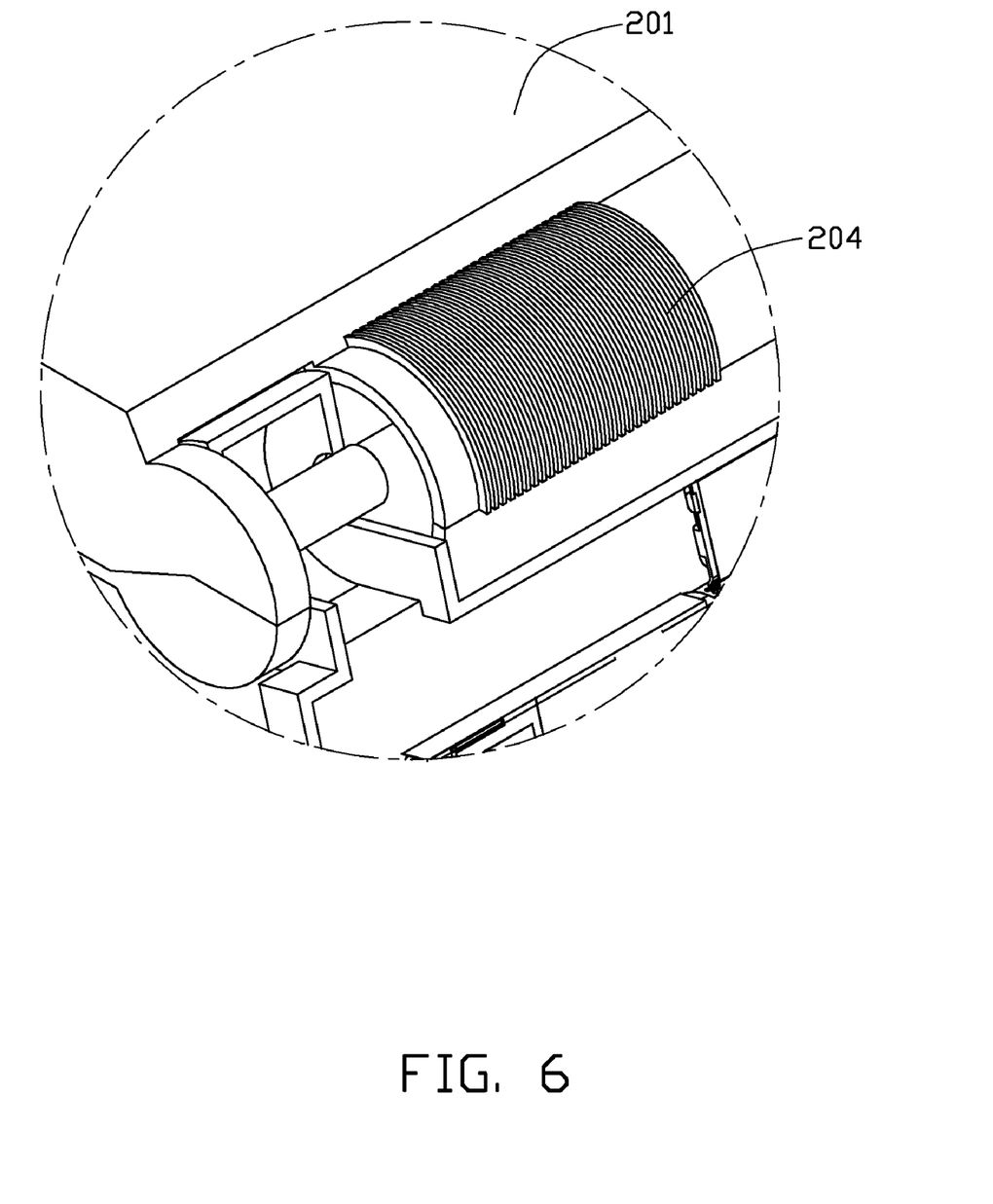
FIG. 6 is an enlarged view of the circled portion VI of FIG. 5 showing a detailed view of a second arc-shaped end.

Referring also to FIGS. 5-6, the base 20 includes an insulating base plate 201 at bottom. The base plate 201 includes a second arc-shaped end 202. The second arc-shaped end 202 includes an arc-shaped outside surface 203 that including a plurality of protruding ridges 204 spaced from each other. In the embodiment, there are equal numbers of the ridges 204 and the slots 104. Each ridge 204 includes a second conductive member 205 (see FIG. 7). In the embodiment, the second conductive member 205 is a metal layer coated on the ridge 204. Each second conductive member 205 is connected to one contact (not shown) of the second connector 40.

In the embodiment, the notebook computer 1 further includes a protective cover 50 to shield exposed portions of the ridges 204 when the ridges 204 are not received in the slots 104 to prevent the ridges 204 from being damaged. A gap 501 (see FIG. 7) is formed between the protective cover 50 and the second arc-shaped end 202 to receive the first arc-shaped end 102.

Figure 7:
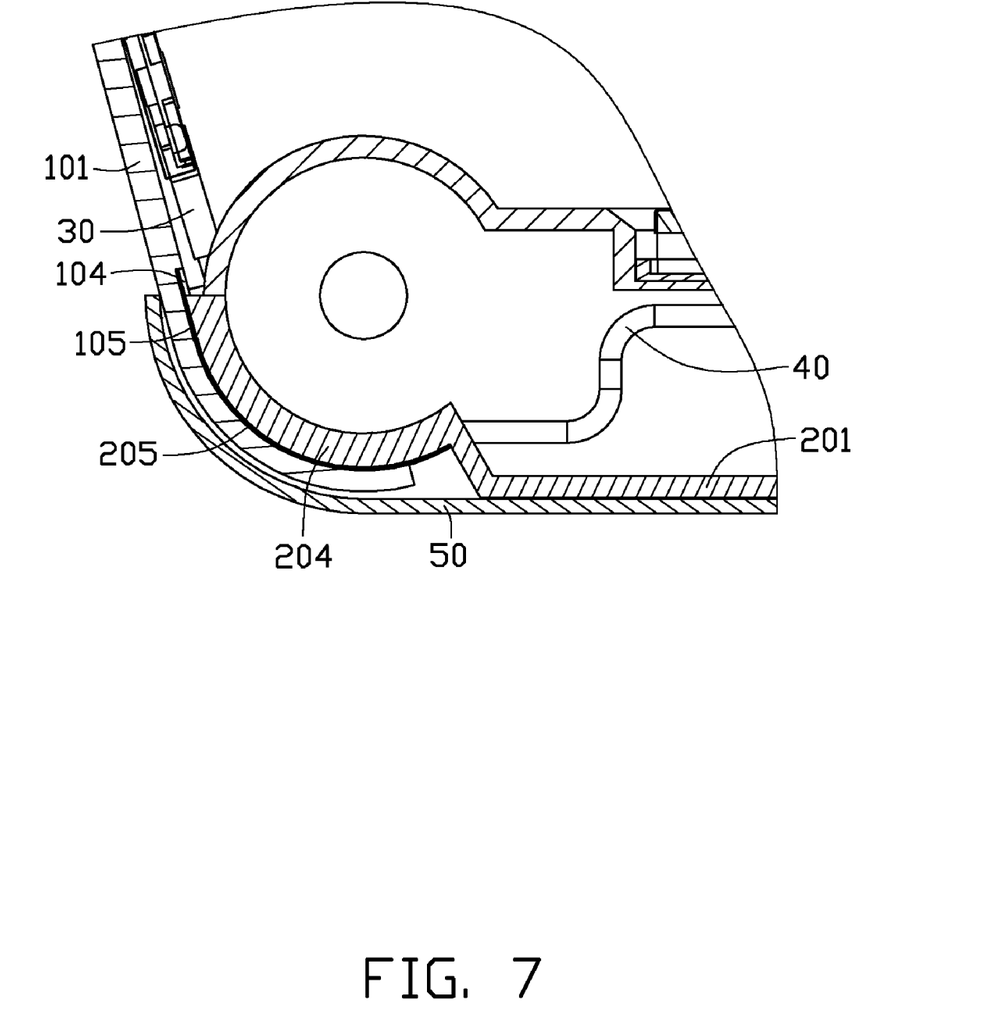
FIG. 7 is a partial, cross-sectional view of the foldable computing device of FIG. 1, taken along line VII-VII of FIG. 1, showing a first state of the cover and a base.
Figure 8:
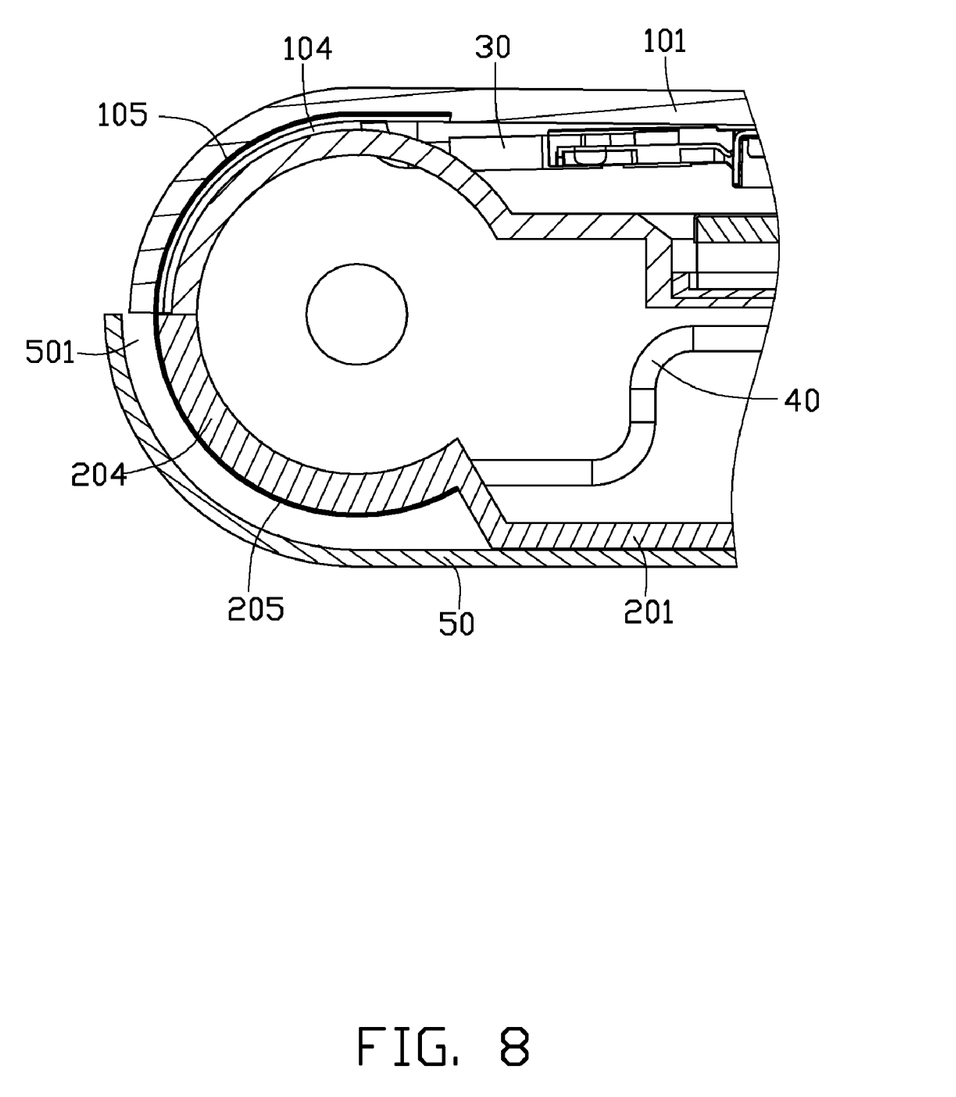
FIG. 8 is similar to FIG. 7 but showing a second state of the cover and the base.

Referring to FIGS. 7-8, when the display 10 is rotated to a predetermined position, the arc-shaped end 102 moves into the gap 501 with the ridges 204 received in the slots 104, respectively, causing the conductive members 105 to contact the conductive members 205. The connectors 30 and 40 are thus electrically connected. Rotating the display 10 back to a closed position, causes the conductive members 105 to lose contact with the conductive members 205, thus the connectors 30 and 40 become disconnected.

Figure 9:
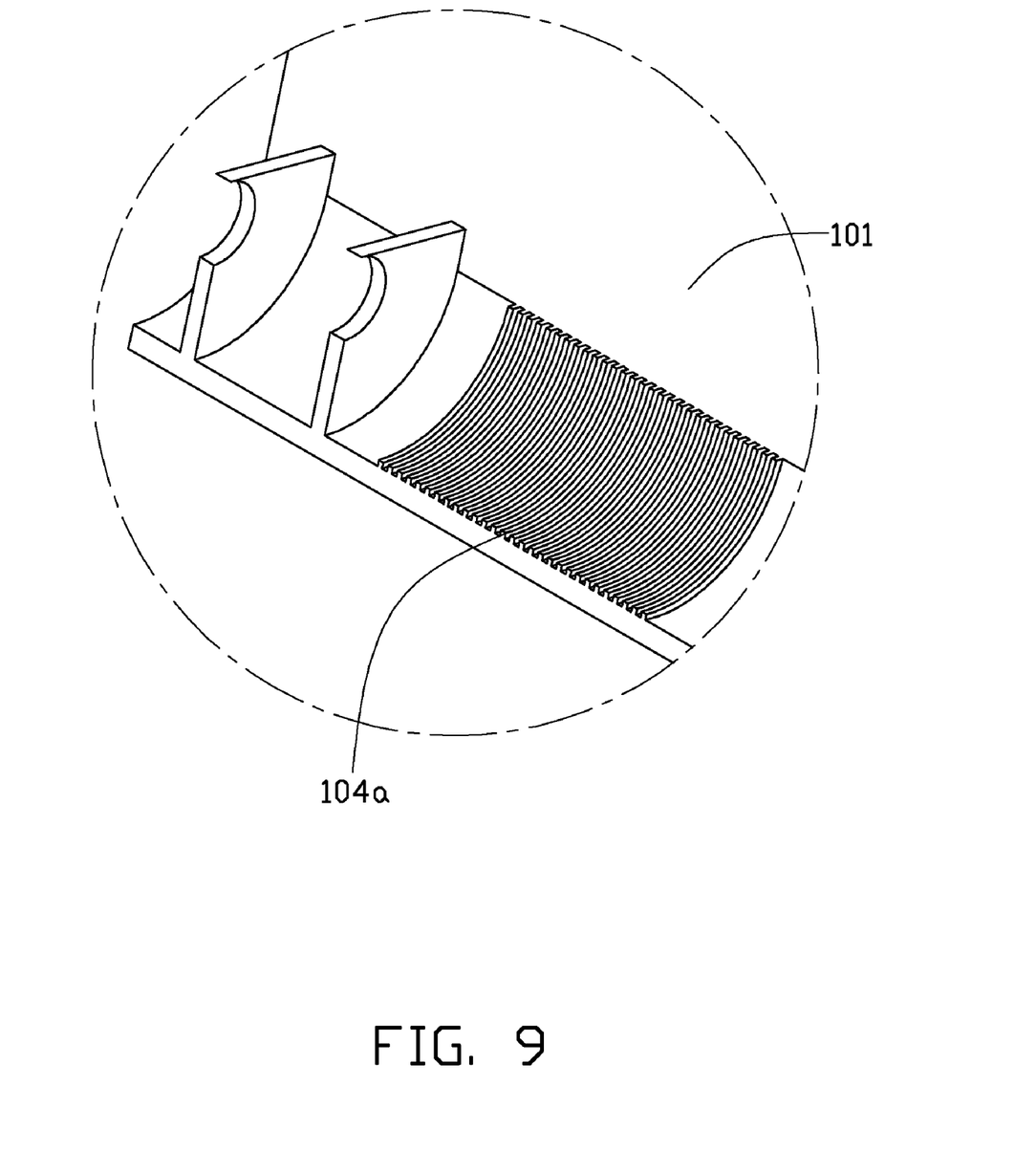
FIG. 9 is similar to FIG. 4 but showing a first arc-shaped end in an alternative embodiment.
Figure 10:
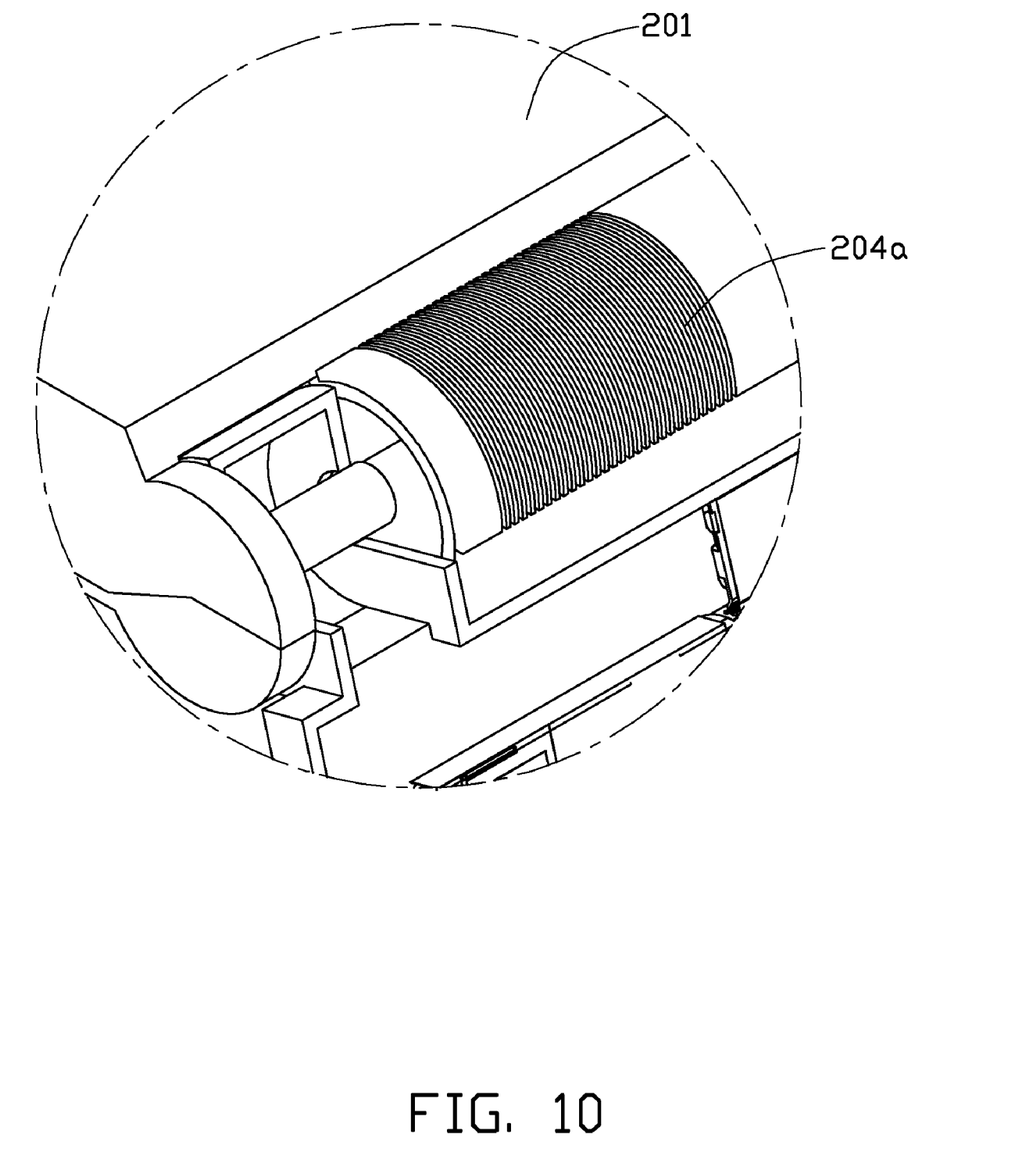
FIG. 10 is similar to FIG. 6 but showing a second arc-shaped end in an alternative embodiment.

Referring to FIGS. 9-10, in an alternative embodiment, a notebook computer 1a is substantially the same as the notebook computer 1 except for the following: a plurality of ridges 104a protrude from the inner surface 103 of the cover 101, and a plurality of slots 204a are defined in the outside surface 203 of the base plate 201.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A foldable computing device comprising:
   a display comprising a cover comprising a first arc-shaped end, the first arc-shaped end comprising a arc-shaped inner surface comprising a plurality of first conductive members;
   a base comprising a base plate comprising a second arc-shaped end, the second arc-shaped end comprising a arc-shaped outside surface comprising a plurality of second conductive members;
   a first connector electrically connected to the display and the plurality of first conductive members, respectively; and
   a second connector electrically connected to the base and the plurality of second conductive members;
   wherein when the display is rotated to a predetermined position, the plurality of first conductive members contact plurality of the second conductive members.

2. The foldable computing device as described in claim 1, wherein the inner surface of the first arc-shaped end defines a plurality of slots, the first conductive members are coated in the plurality of slots; the outside surface of the second arc-shaped end comprises a plurality of protruding ridges, the second conductive members are coated on the plurality of ridges.

3. The foldable computing device as described in claim 1, wherein the inner surface of the first arc-shaped end comprises a plurality of protruding ridges, the first conductive members are coated on the plurality of ridges; the outside surface of the second arc-shaped end defines a plurality of slots, the second conductive members are coated in the plurality of slots.

4. The foldable computing device as described in claim 1, wherein when the display is rotated to a closed position, the plurality of first conductive members loses contact with the plurality of second conductive members, and the first connector and the second connector are disconnected.

5. The foldable computing device as described in claim 2, further comprising a protective cover, wherein the protective cover protects the plurality of ridges from being damaged.

6. The foldable computing device described as in claim 5, wherein a gap is formed between the protecting cover and the second arc-shaped end to receive the first arc-shaped end.

7. The foldable computing device as described in claim 1, wherein the foldable computing device is a notebook device.

8. The foldable computing device as described in claim 2, wherein the plurality of first conductive members and the plurality of second conductive members are metal layouts.

9. The foldable computing device as described in claim 3, wherein the plurality of first conductive members and the plurality of second conductive members are metal layouts.

* * * * *